United States Patent [19]
Loyd

[11] Patent Number: 4,964,510
[45] Date of Patent: Oct. 23, 1990

[54] LASER DISK RETAINING CASE

[76] Inventor: Thomas D. Loyd, 14709 W. Burnsville Pkwy. #73, Burnsville, Minn. 55337

[21] Appl. No.: 389,762

[22] Filed: Aug. 4, 1989

[51] Int. Cl.$^5$ .............................................. B65D 85/57
[52] U.S. Cl. .................................... 206/306; 206/311; 206/312; 206/444; 312/12; 312/15
[58] Field of Search ............... 206/232, 309, 311, 312, 206/444, 387; 312/10, 12, 15, 16, 18

[56] References Cited

U.S. PATENT DOCUMENTS

| | | |
|---|---|---|
| 895,655 | 8/1908 | Mitchell . |
| 1,238,735 | 9/1917 | Barlow .............................. 206/311 |
| 2,226,779 | 12/1940 | Roads . |
| 2,402,044 | 6/1946 | Heckman . |
| 3,462,206 | 8/1969 | Habnish et al. . |
| 3,730,602 | 5/1973 | Campbell et al. .................. 206/309 |
| 4,138,703 | 2/1979 | Stave et al. ......................... 206/444 |
| 4,463,849 | 8/1984 | Prusak et al. . |
| 4,630,732 | 12/1986 | Snyman . |
| 4,641,747 | 2/1987 | Mestdagh et al. ................. 206/309 |
| 4,767,003 | 8/1988 | Rice et al. .......................... 206/232 |
| 4,771,883 | 9/1988 | Herr et al. .......................... 206/309 |
| 4,771,890 | 9/1988 | Hofland et al. .................... 206/309 |
| 4,807,749 | 2/1989 | Ackeret ............................. 206/309 |
| 4,811,995 | 3/1989 | Ackeret ............................. 312/15 |

FOREIGN PATENT DOCUMENTS 38547 6/1931 France .................................. 312/15

Primary Examiner—David T. Fidei

[57] ABSTRACT

The disk case herein includes a narrow rectangular housing having an interior volume defined by two flat, closely spaced and parallel opposed rectangular surfaces joined aroung the four common edges thereof by a narrow perimeter edge extending there between. A disk access slot extends through one of the perimeter edges along substantially the length thereof and communicates with an interior disk retaining space. A disk receiving track extends along the perimeter of the disk retaining space. A portion of the track extends along an inclined plane which plane extends downwardly in a direction from the back perimeter edge to the front perimeter edge. A disk release mechanism is partially cut out from or formed from one of the rectangular sides, the exterior surface thereof being substantially flush with the exterior surface of the rectangular side, and located adjacent the top perimeter edge and positioned substantially along the middle thereof. The release mechanism includes a body portion integral on its top end with the top perimeter case edge by a narrowed or thin flexible bridge portion. A resilient disk retaining arm extends from the body portion in a direction substantially parallel with the top perimeter case edge, and terminates with a disk contacting tip end.

47 Claims, 3 Drawing Sheets

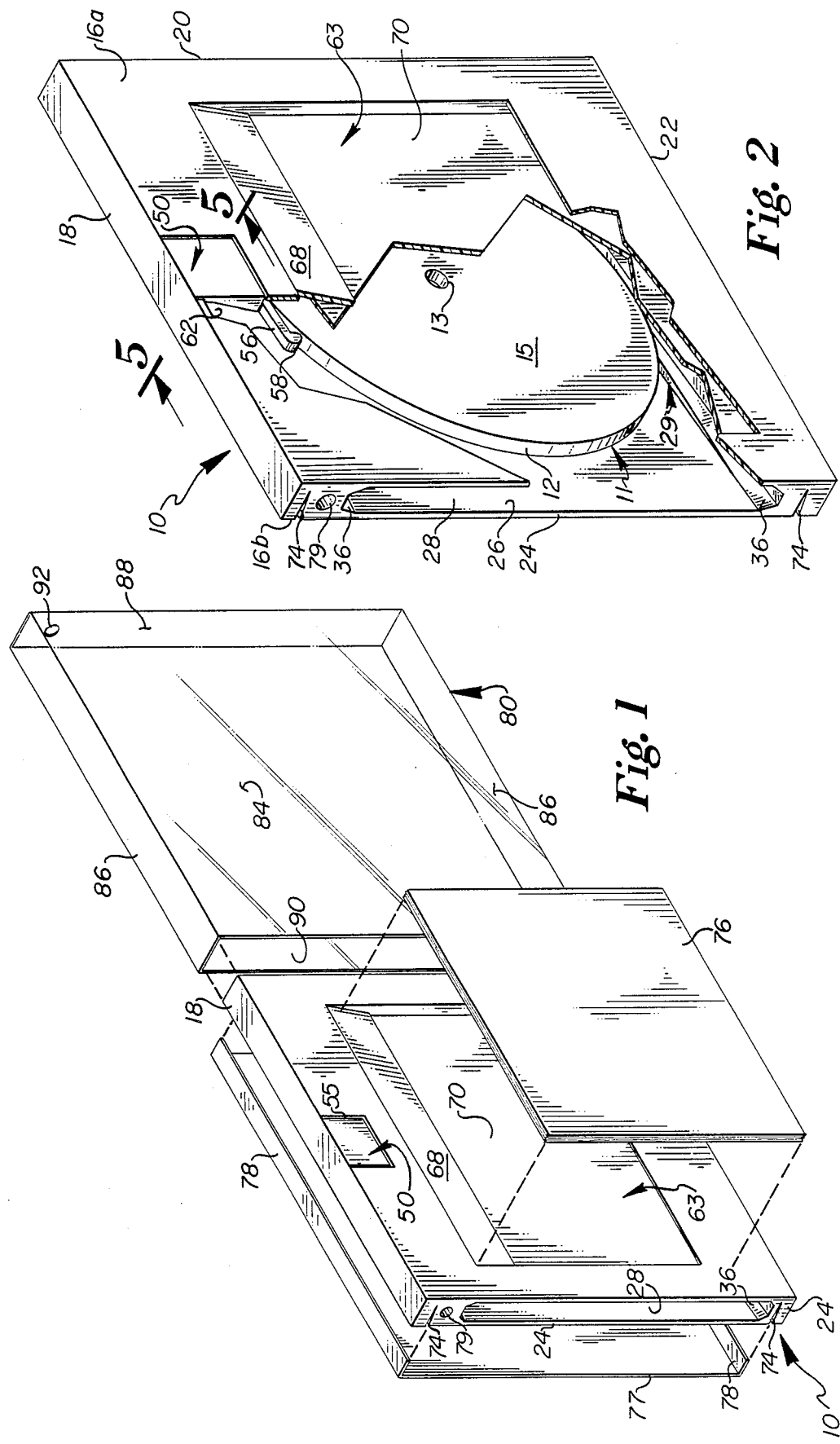

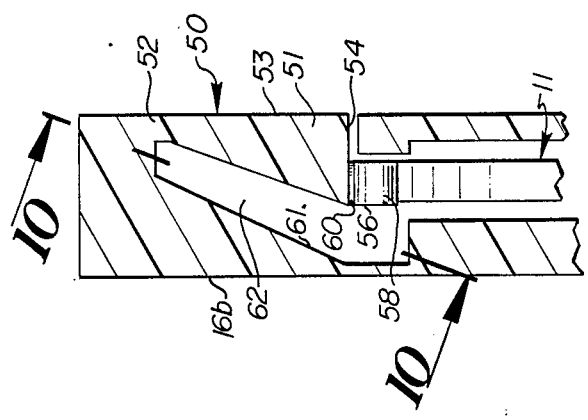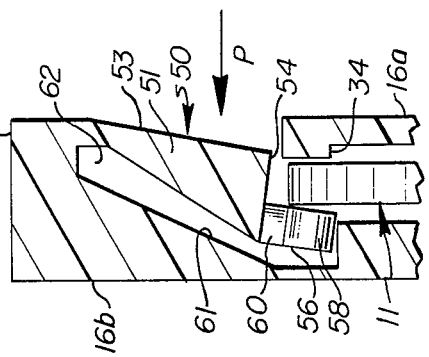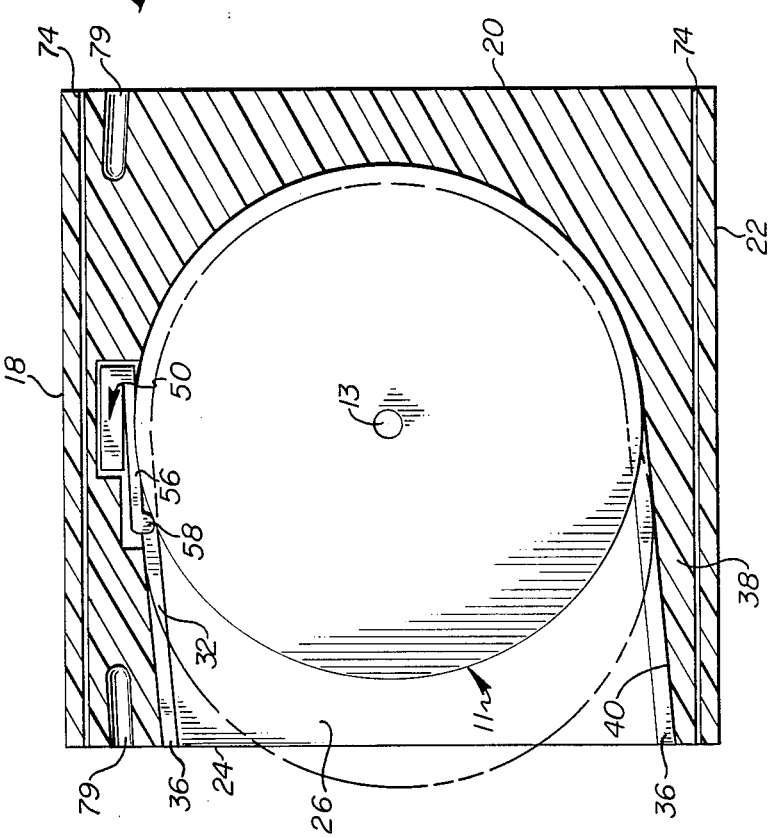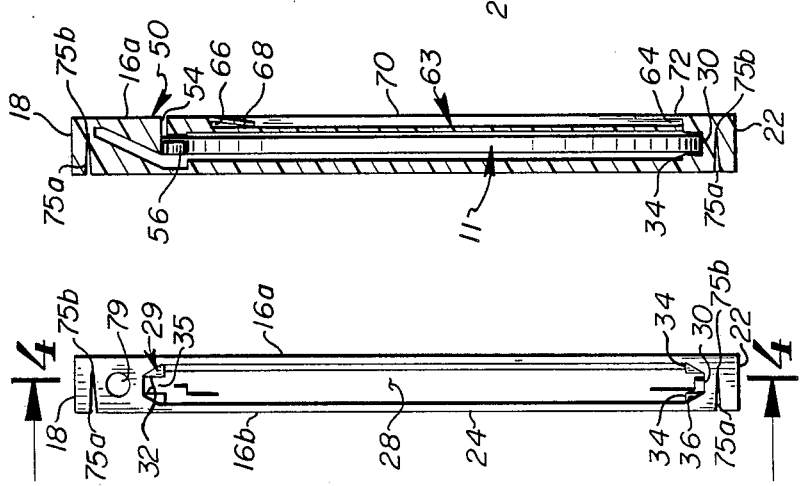

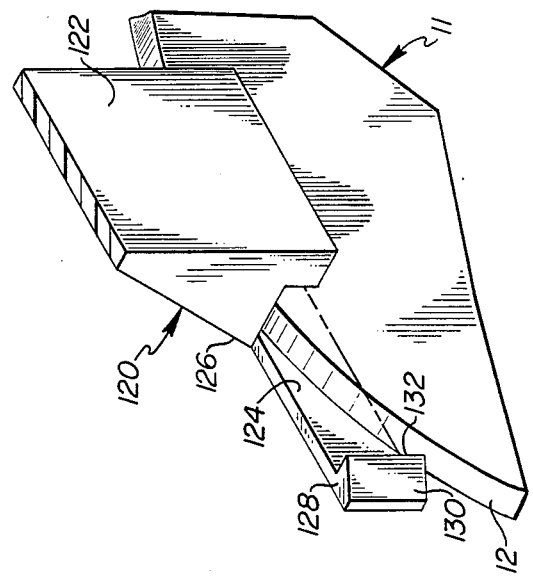
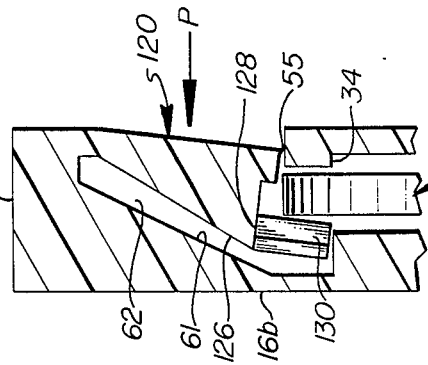
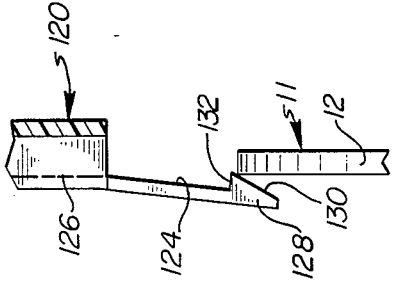
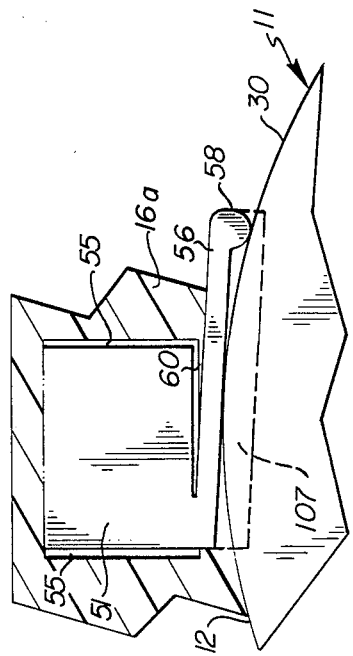
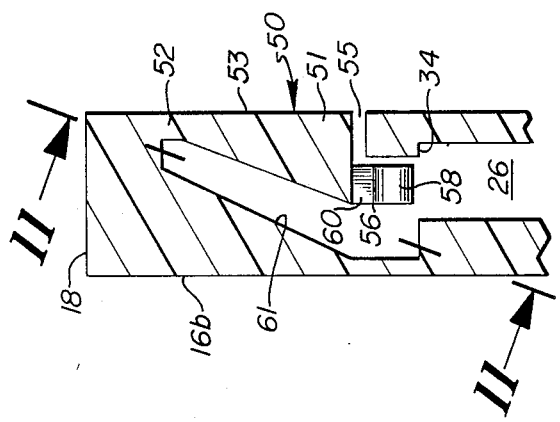

LASER DISK RETAINING CASE

BACKGROUND OF THE INVENTION

1. Field of the Invention

The present invention relates generally to storage containers for retaining disk shaped objects, and more particularly to storage cases that provide for the safe holding of individual laser disks and that provide for the convenient removal therefrom and replacement therein of the disk.

2. Background

Laser disks are currently available in a variety of formats containing audio and/or video material recorded thereon. Such disks are typically packaged and sold at the retail level in individual plastic protective containers or cases. These containers usually includes written and pictorial printed matter therein for the purpose of describing and identifying the material recorded on the disk. Also, such containers typically include two halves hinged together along a common edge allowing the disk to be removed therefrom by opening the two container halves in a book like fashion. These plastic containers are intended to provide, not only for packaging of the disk, but also as a means for its storage after purchase by the consumer. Unfortunately, it has been found that the hinged opening retrieval system is not particularly convenient, and is conducive to leaving of the disks out of their containers. Thus, the disks can easily become disorganized, and more importantly, are then more susceptible to reduction in playback quality due to mechanical damage and to accumulations on the surfaces thereof of dust and other unwanted foreign matter. In addition, hinged disk cases are not ideally suited for use in a multiple storage system, as each case must ultimately be selected individually and removed therefrom, and then opened to retrieve the disk.

A disk retaining case has been proposed that include a disk retaining spine slideably engageable within an outer protective cover, as seen in U.S. Pat. No. 4,463,849 to Prusak et al. However, such containers are made to be inserted into a cooperatively designed disk playing machine, after which the protective disk cover is removed from the machine and the disk separated from the spine by the machine. This approach applies primarily to disks containing video information, and is used to minimize the accumulation of foreign material on, and damage to the surfaces of the disk by preventing the necessity of direct handling thereof and exposure to an unprotected environment to which video disks are particularly susceptible. However, such a method of disk storage and playing is not used for all laser disk formats as it requires a more complex and expensive playing machine.

Accordingly, it would be desirable to have a laser disk container that permits easy removal therefrom and replacement therein of the disk, and is therefore, conducive to a more orderly and safe storage of the disk.

SUMMARY OF THE INVENTION

The objects and advantages of the laser disk container of the present invention include, but are not limited to, the following:

1. To provide for a laser disk container that permits the convenient removal therefrom and replacement therein of a laser disk with the minimum of manipulation of the container or the disk.

2. To provide for such a container that serves both as a retail package, and as a permanent case for the disk.

3. To provide for such a container that is designed to easily and conveniently cooperate with and hold any accompanying printed matter used to describe and identify the contents of the disk.

4. To provide for such a container that is inexpensive to manufacture.

5. To provide for such a container that permits convenient multiple storage thereof.

The laser disk case of the present invention is preferably formed of a resilient plastic material as a fully integral unitary structure. The disk case herein includes a narrow rectangular housing having an interior space defined by two flat, closely spaced and parallel opposed rectangular surfaces joined around the four common edges thereof by a narrow perimeter edge extending there between. A disk access slot extends through one of the perimeter edges along substantially the length thereof. The access slot extends between and transversely to a top and a bottom container edge, and parallel to, and across from the remaining back edge.

A cross-section of the case along a plane parallel to the major rectangular sides reveals that the interior space is U-shaped with the open end thereof coinciding with the access slit, and the round closed end thereof adjacent the back edge. A disk receiving track extends along the U-shaped perimeter of the interior disk retaining space. A portion of the track extends along an inclined plane which plane extends downwardly in a direction from the back perimeter edge to the slot containing front perimeter edge.

A disk release mechanism is partially cut out from or formed from one of the rectangular sides, the exterior surface thereof being substantially flush with the exterior surface of the rectangular side, and located adjacent the top perimeter edge and positioned substantially along the middle thereof. The release mechanism includes a body portion integral on its top end with the top perimeter case edge by a narrowed or thin flexible bridge portion. A resilient disk retaining arm extends from the body portion in a direction substantially parallel with the top perimeter case edge, and terminates with a rounded disk contacting tip end. The arm is centered in, and spans most of the width of the disk receiving track, and extends slightly downwardly therein. A receiving space is formed in the case body across from the release mechanism in a direction transverse to the extension of the top perimeter case edge.

The invention herein also includes structures that are designed to efficiently hold various forms of printed matter that typically accompany laser disks, and particularly laser disks that contain pre-recorded music. In particular, the exterior side surface that includes the release mechanism also includes a recessed booklet retaining area. This recessed area has a recessed surface that terminates on one end with a slotted bottom edge which runs parallel with the bottom perimeter case edge. Opposite from and parallel with the slotted edge, the recessed area terminates with a biased flexible booklet retaining edge. This retaining edge includes a flap that is integral with the material of the case and has a normal position wherein it is angled inwardly towards the recessed surface. Further structure for retaining printed matter consists of a pair of parallel slits extending into the exterior surface of the case side opposite from the side having the booklet containing recess. One slit extends along and adjacent the bottom case edge and the other extends along and adjacent the top case edge. Each slit gradually decreases in width in a direction from the exterior of the side surface into the disk. The depth of each slit is approximately equal to half the width of the perimeter case edges.

The present invention can also include a cover slip. The cover slip is a container preferably made of a clear soft vinyl plastic material having an open end into which the case of the present invention can be inserted. Maximum advantage can be obtained if the access slit containing end is inserted first so that this opening into the disk retaining space can be covered, thereby reducing entrance therein of unwanted particulate matter.

In operation a disk is first inserted into the interior space through the access slit, the perimeter edge of the disk being guided by the edge receiving track. As the disk is being inserted, the perimeter edge thereof begins to contact the tip end of the resilient retaining arm of the release mechanism, whereby the arm is flexed slightly upwardly to a maximum upward flexed position when the disk is fully inserted. The disk is fully inserted when the a portion of the perimeter thereof lies directly adjacent the rounded perimeter of the interior space. The disk is then retained in the case by the downward force exerted normal to the perimeter edge of the disk by the arm. Removal of the disk from the case involves applying manual pressure to the release mechanism. Specifically, the body portion thereof is pressed whereby it, and the arm integral therewith, are pushed into the receiving space. This movment is permitted by the flexible portion joining the release mechanism to the case body. When deflected into the receiving space, the arm is removed from contact with the disk so that disk is free to roll out of the case along the inclined plane portion of the disk track. This movement is spontaneous if the inclined plane portion of the track is oriented with respect to gravity such that is extends downwardly with respect thereto. After removal from the case, the release mechanism is relieved of pressure and then flexes back into its normal disk receiving position.

The present invention therefore provides for a convenient means for retaining a disk by simple insertion therein through the disk access slot. Removal is also easily accomplished by a single manipulation of the release mechanism. Furthermore, as the release mechanism does not extend outwardly from the surface of the case, the multiple storage of a plurality of the cases of the present invention in a side by side orientation is facilitated.

A booklet containing information relating to the material recorded on the disk, typically associated with disks containing pre-recorded music, is retained on the present invention by first inserting an edge thereof into the slot of the recessed retaining area. The opposite edge of the booklet is then inserted between the angled flap and the surface of the recessed area. The angled flap the serves to retain the booklet by the resiliency thereof as it presses back towards its normal position. Laser disks containing pre-recorded music, also typically need a means for displayig a photograph or art work describing or identifying the contents of the disk. In the present invention this is accomplished by the used of the retaining slits. Specifically, such desired printed matter is contained on a card having approximately the same surface area of the sides of the case. Tabs are bent at right angles in the card along opposite sides thereof of sufficient depth to be inserted into and then retained in the angled slits as they reduce to a width less than that of the card.

Thus, it can also be appreciated that the present invention provides convenient and inexpensive structure for retaining various printed matter typically found associated with laser disks.

BRIEF DESCRIPTION OF THE DRAWINGS

Further objects and advantages of the present invention can be had in view of the following detailed description which refers to the following figures, wherein:

FIG. 1 is an exploded perspective view of the present invention showing the manner of attachment and relationship of the printed matter thereto and the manner in which the cover slip cooperates therewith.

FIG. 2 shows a partially cut away perspective view of the present invention.

FIG. 3 shows an end view of the perimeter edge of the present invention containing the access opening.

FIG. 4 shows a cross-sectional plan view along lines 4—4 of FIG. 3.

FIG. 5 shows a cross sectional view along lines 5—5 of FIG. 2.

FIG. 6 shows an enlarged detail plan view of the release mechanism in FIG. 5.

FIG. 7 shows an enlarged detail of the release mechanism in FIG. 5 with the release mechanism in its flexed disk release position and the disk retaining arm in its normal or unbiased position.

FIG. 8 shows an enlarged detail of the release mechanism in FIG. 5 with the release mechanism in its unbiased or normal disk receiving position and the disk retaining arm in its normal or unbiased position in position to receive a disk.

FIG. 9 shows a cross-sectional view of an alternate embodiment of the release mechanism of the present invention as per the manner of representation of the release mechanism of FIG. 8.

FIG. 10 shows an interior plan view along lines 10—10 of FIG. 6 of the disk releasing mechanism in the normal disk retaining position.

FIG. 11 shows an interior plan view along lines 11—11 of FIG. 8 of the disk releasing mechanism in the normal disk retaining position.

FIG. 12 shows a perspective view of a further alternate embodiment of a release mechanism of the present invention.

FIG. 13 shows a top plan view of the release mechanism of FIG. 12.

FIG. 14 shows a cross-sectional view of the release mechanism as shown in FIG. 12 as per the manner of representation of the release mechanism of FIG. 8.

DETAILED DESCRIPTION OF THE PREFERRED EMBODIMENT

The disk retaining case of the present invention is seen in FIG. 1 and generally referred to by numeral 10. Referring also to FIGS. 2, 3 and 4, it can be seen that case 10 is sized to retain a round planar disk shaped object 11 such as a laser disk, having a perimeter edge 12, a center point or hole 13 and information containing side surfaces 15. Case 10 includes two opposed and parallel rectangular sides 16a and 16b. Sides 16a and 16b are joined around their perimeter by a top perimeter edge 18, a back perimeter edge 20, a bottom perimeter edge 22 and a front perimeter edge 24. Case 10 includes a U-shaped disk retaining space 26 there within. Access to retaining space is permitted through disk access opening 28, which opening 28 extends through front perimeter edge 24 and communicates with space 26. As seen by also referring to FIG. 5, a disk guiding track 29 extends around the perimeter of space 26. Track 29 includes a bottom surface 30 parallel vertical sidewalls 32 and shoulders 34. Track 29 terminates on each end thereof at opening 26, and at each such terminal end, and for a short distance inwardly thereof in a direction roughly towards back edge 20, includes angles portions 36 wherein shoulders 34 have been eliminated. U-shaped space 26 is oriented within case 10 at an angle such that, as is best seen in FIG. 4, case 10 includes an inclined plane portion 38. In FIG. 4 will be understood to represent case 10 with respect to the force of gravity whereby bottom edge 22 is below top edge 18. Then portion 38 includes a top edge 40 that is angled downwardly with respect to the force of gravity in a direction from back edge 20 to front edge 24. Therefore, that portion of track 29 that is coextensive with edge 40, likewise extends in the same downwardly direction.

By also referring to FIGS. 6, 7, 8, 10 and 11, it can be seen that case 10 includes a release mechanism 50 located in side 16b adjacent top edge 18. Release 50 includes a manually depressible body portion 51 integral with side 16a and connected thereto by a flexible bridge portion 52 and also includes an exterior contact surface 53 and a bottom surface 54. A narrow bordering space 55 extends around the perimeter of body portion 51, separating it, with the exception of bridge 52, from side 16a. A disk retaining arm 56 is integral with body portion 52 and extends therefrom at a transverse angle and terminates with a rounded disk contacting end 58. The non-biased or normal position of arm 56 is seen in FIGS. 7, 8, and 11, wherein arm 56 is displaced below surface 54 creating a gap 60 there between. The biased or disk retaining position of arm 56 is seen in FIGS. 6 and 11, wherein arm 56 is in a position closely adjacent surface 54, and end 58 is contacting edge 12 of disk 11. Moreover, as seen in FIGS. 6 and 10, body portion 51 is in its normal or unbiased position wherein surface 53 is flush with the exterior surface of side 16a. A release mechanism cavity 62 is defined between mechanism 50 and an interior surface 61 of side 17.

Referring to FIGS. 1, 2 and 5, it can be seen that side 16a includes a recessed pamphlet retaining space 63. Retaining space 63 includes a bottom channel 64 and top channel 66. A flexible retaining shoulder 68 extends horizontally along and bordering channel 66 and is angled inwardly towards a retaining space surface 70. A lip 72 extends vertically along and borders channel 64. A pair of narrow slits 74 extend parallel to each other in side 17 and extend along and adjacent to top edge 18 and bottom edge 22 repectively. Slits 74 angle inwardly in a direction from a larger open end 75a to a smaller closed end 75b as best seen in FIGS. 4 and 5. Referring to FIG. 1, retaining space 63 serves to hold a booklet 76, and slits 74 serve to retain a card 77 having top and bottom edges 78, as more fully described below. A pair of holes 79 extend inwardly of case 10 from sides 20 and 24 thereof adjacent top edge 18. Holes 79 do not extend parallel with edge 18, rather, they extend in a direction slightly upwardly or towards edge 18. A cover slip 80 is rectangular in shape and has opposite parallel sides 84, top and bottom perimeter edges 86, a back edge 88 and an open end 90. A hole 92 extends through back edge 88 thereof.

An alternate embodiment of the release mechanism of the present invention is see in FIG. 9. As seen therein, there is a release 100, similar to release 50, that includes a body portion 102 secured to side 16a by a bridge 103, and body 102 having a retaining arm 104 extending therefrom and flexibly secured thereto and terminating with a rounded contact end 106. However, unlike release 50, release 100 also includes a disk perimeter retaining edge portion 107 extending along arm 104, also seen in phantom outline in FIGS. 10 and 11, and a stop portion 108 extending downwardly from body 102. A modification has also been made wherein a stop 110 extends upwardly from shoulder area 112.

A further embodiment of the release mechanism of the present invention is seen in FIGS. 12, 13 and 14. As seen therein a release 120 includes a body portion 122 and a flattened elongate arm 124 integral therewith and extending therefrom. Unlike releases 50 and 100, arm 124 is flexible in a side to side motion through a horizontal plane substantially perpendicular to sides 16a and 16b, and is integral with the interior bottom portion 126 of body 112 of release mechanism 120. This motion and manner of attachment is opposed to the up and down movement through a vertical plane substantially parallel wide sides 16a and 16b, and attachment adjacent the rear of the respective body portion of former embodiments 50 and 100. In addition, arm 124 terminates with a pointed end portion 128 having an angled disk contact surface 130 and a disk retaining shoulder extending substantially at a right angle to arm 124.

In operation, case 10 is designed to conveniently carry and protect, and provide for the easy release from and reloading therein of a disk shaped object 11. Specifically, disk 11 is first inserted into interior space 26 through access opening 28, wherein edge 12 of disk 11 is guided along surface 30 between shoulders 34 of track 29. Angled portions 36 serve to insure that edge 12 is smoothly and correctly guided into channel 35 of track 29. It can now be appreciated that as disk 11 is inserted into case 10, edge 12 will begin to contact end 58 moving arm 56 upwardly to the postion as seen in FIGS. 2, 4, 6 and 7. In this biased position arm 56 exerts pressure downwardly on edge 12 as indicated by the arrow of FIG. 7. This pressure combined with the fact that contact end 58 is somewhat in advance of the centerpoint 13 of disk 11, serves to retain disk 11 within case 10.

Removal of disk 11 from case 10 is accomplished by manipulation of mechanism 50. In particular, by exertion of manual pressure on surface 53 of body 51 in the direction of arrow P of FIG. 7, arm 56 and body 51 are pushed into cavity 62. The motion thereof can be viewed as partially rotational about bridge 52 and permitted by the flexing of bridge 52. As a result of such motion, as seen in FIGS. 7 and 8, arm 56 is removed from contact with edge 12 so arm 56 then extends downwardly to its unbiased or normal position whereby mechanism 50 no longer retains disk 11 within case 10. Referring to FIG. 4, if case 10 is oriented with respect to gravity as previously described, it can be appreciated that disk 11, no longer in contact with arm 56, will then be free under the force of gravity to spontaneously roll down inclined plane 38 along the portion of track 29 coextensive with top edge 40 and ultimately through access 26 to be grasped by the user of the invention herein. Pressure is then released upon surface 53 and mechanism 50 returns to its normal unbiased position as seen in FIG. 8, with arm 56 remaining in its unbiased position. It will be understood that disk 11 can then be easily re-inserted into case 10 through access 26 whereupon the edge 12 thereof will again contact arm 56, are previously described, resulting in disk 11 again being held therein.

The operation of release mechanism 100 is the same as described above for release 50 except that stops 108 and 110 serve to limit the inward movement of release 100. In this manner the travel of release 100 is limited to a distance adequate for release of disk 11 but serves to prevent unneeded flexing of bridge 103, and thus, premature failure that could occur due to excessive fatigue thereof. Also, edge 107 serves as an analogous structure to that portion of track surface 32 that is eliminated by the creation of space 62 needed for the movement of the release mechanism. Thus, additional support and guidance of disk 11 is provided for.

The operation of embodiment 120 can be appreciated wherein, as with release embodiments 50 and 100, inward pressure in the direction of arrow P moves body 122 and arm 124, as seen in FIG. 14, so that disk 11 can be released from case 10 and roll down inclined plane top edge 40, as previously described with the other embodiments. Specifically, in this case, disk 11 is retained by the blockage of its movement that is presented by shoulder 130, which blockage is removed by the inward movement of arm 124 at it is carried by body 122. As seen in FIG. 13, re-insertion of disk 11 results in the perimeter surface 12 thereof first contacting angled surface 128 and causing arm 124 to deflect inwardly, thus permitting the full insertion of disk 11 by moving the obstruction of arm end 128 out of the path of the disk as it is inserted. After disk loading or insertion, arm 124 flexes back into its normal or unbiased position, as seen in FIG. 12. It will be understood that the majority of such motion necessary for the insertion of disk 11 will occur as the result of movement of arm 124 with respect to body portion 122, however, some torsion or motion will be also be imparted to body 122.

As is understood in the art, disks, such as laser disks containing pre-recorded music, are sold with accompanying printed material to advertise the material contained on the disk and also to provide information in regard thereto such as song lyrics and so forth. The present invention provides for such advertising literature by the use of slits 74 and 74 which are positioned as seen in FIG. 1, so that edges 79 of card 78 can be inserted therein. Edges 78 are held in slits 74 and 74 whereby the decrease in width thereof results in a wedging effect on card edges 78. Card 77 is then releasably secured to case 10 and can display the desired graphics and printing on the exterior surface thereof. Furthermore, a booklet 78 can be secured in retaining space 63. Placement therein involves first inserting a bottom edge of booklet 76 in bottom channel 64. The opposite parallel edge of booklet 76 is then inserted under top lip 68 forcing lip 68 to deflect outwardly from its normal position and away from surface 70. Thus, lip 68 will exert a force against booklet 76 serving to releasably hold booklet 76 within compartment 63. An adhesive label, not shown, could also be secured to top edge 18 to provide for an additional means for identifying the contents of case 10.

Cover slip 80 is sized to fit over case 10 whereby case 10 can be placed therein through open end 90 thereof. It should be pointed out that the exploded view of FIG. 1 shows slip 80 in position to extend first over back edge 20 of case 10. However, it can be more desirable for front edge 24 be first inserted through opening 90 so that access 28 is blocked by cover slip end 88. In this manner any unwanted foreign particles are better prevented from entering interior space 26 through access 28 and possibly compromising the performance of disk 11. The pair of holes 79 provide suspension of case 10 from a pair of pins, not shown. Such pins form a part of applicant's co-pending application relating to a device for holding a plurality of the case of the present invention in a multiple storage unit. Hole 92 in slip 80 is positioned on back edge 90 to cooperate with holes 79 thereby permitting such pin insertion when slip 80 covers case 10.

Case 10 is preferably an integral structure formed of a suitable plastic material. In addition, it can be understood that the particular plastic should provide for the operation of the present invention, whereby there exists some resistance to movement away from a normal position or tendency to return to that normal position thereby providing for the desired retaining force in the case of arm 56 and lip 68, and desired movement and positioning of mechanism body 51 in the case of bridge 52.

It can be appreciated that mechanism 50 provides both a means for retaining and for releasing disk 11. This combination of functions, especially when also accomplished with a unitary integral structure as described herein, allows for a disk case that is relatively easy and inexpensive to manufacture. In addition, mechanism 50 does not extend from the surface of case 10, thus, facilitating multiple storage of such disks in a side by side manner that minimizes the amount of space needed for such storage. Also, such flush positioning reduces the chance of mechanism 50 being accidentally broken.

It will be apparent to those of skill in the art that various modifications can be made to the present invention without escaping the spirit or scope of the essential attributes thereof. Therefore, it is desired that the present embodiment be considered in all respects as illustrative and not restrictive, reference being made to the following claims rather than the foregoing description to indicate the scope of the invention.

What is claimed is:

1. A case for holding a disk shaped object, comprising: first and second opposed sides each side lying substantially parallel and adjacent each other and each side having an exterior surface, and each side connected to the other around common perimeters thereof by top, back, bottom and front perimeter edges extending between the opposed sides and defining an interior volume of the case, an interior disk retaining space within the interior volume, an elongate disk access slot extending through and along the front perimeter edge and communicating with the disk retaining space, an inclined plane portion within the interior volume of the case and the inclined plane portion having a top inclined edge extending downwardly in a direction from the back perimeter edge to the front perimeter edge, and a release mechanism for retaining the disk within the retaining space and the release mechanism operable for permitting removal of the disk from the retaining space.

2. The disk holding case as defined in claim 1, and the release mechanism located in one of the opposed sides thereof.

3. The disk holding case as defined in claim 2 and the release mechanism having a first unbiased position with a body portion thereof substantially flush with the surface of one opposed side and movable from the first position to a second disk release biased position in a direction substantially toward the opposite opposed side.

4. The disk holding case as defined in claim 3, and the body portion integrally secured to an opposed side with a bridge portion, the bridge portion providing for flexing of the release mechanism between the first and second release mechanism positions.

5. The disk holding case as defined in claim 4, and the release mechanism having a retaining arm extending from the body portion thereof in a direction transverse to the direction of operation of the release mechanism.

6. The disk retaining case as defined in claim 5, and the retaining arm having a disk retaining end portion.

7. The disk holding case as defined in claim 6, and the arm flexible through a plane substantially coextensive with the first and second opposed sides between an unbiased disk receiving position and a biased disk retaining position.

8. The disk holding case as defined in claim 6, and the retaining arm flexible in a direction through a plane transverse to the plane of extension of the first and second opposed sides from an unbiased disk receiving position to a biased position for permitting insertion of the disk in the holding case.

9. The disk holding case as defined in claim 8, and the retaining arm having an end portion including a disk contact surface for contacting with the disk for moving the retaining arm to the biased position for permitting insertion of th disk in the case.

10. The disk holding case as defined in claim 9, and the retaining arm end portion including a disk retaining shoulder.

11. The disk holding case as defined in claim 1, and including a disk guiding track extending along the perimeter of the disk retaining space and a portion of the track coextensive with the top inclined edge.

12. The disk holding case as defined in claim 1, and one opposed side having card retaining means.

13. The disk holding case as defined in claim 12, and the card retaining means including first and second card retaining slits extending into the opposed side and parallel to each other and adjacent the top and bottom perimeter edges respectively.

14. The disk holding case as defined in claim 1 and the one opposed side including booklet retaining means.

15. The dish holding case as defined in claim 14, and the booklet retaining means including a bottom channel and a top channel and the top channel having a retaining flap flexible between a normal unbiased position and a biased booklet retaining position.

16. The disk holding case as defined in claim 1, and further including support means providing for support of the case.

17. The disk holding case as defined in claim 16, and the means providing for support including first and second holes extending into the front and back perimeter edges.

18. A case for holding a disk shaped object, comprising: first and second opposed sides each side lying substantially parallel and adjacent each other and each side having an exterior surface, and each side connected to the other around common perimeters thereof by top, back, bottom and front perimeter edges extending between the opposed sides and defining an interior volume of the case, an interior disk retaining space within the interior volume, an elongate disk access slot extending through the front perimeter edge and communicating with the disk retaining space, a disk guiding track extending along the perimeter of the disk retaining space, and inclined plane portion within the interior volume of the case and the inclined plane portion having a top inclined edge extending downwardly in a direction from the back perimeter edge to the front perimeter edge and a portion of the guiding track coextensive with the top inclined edge and terminating on one end with the access slot, and a release mechanism for retaining the disk within the retaining space and the release mechanism operable for permitting removal of the disk from the retaining space.

19. The disk holding case as defined in claim 18, and the release mechanism located in one of the opposed sides thereof.

20. The disk holding case as defined in claim 19, and the release mechanism having a first unbiased position with a body portion thereof substantially flush with the surface of one opposed side and movable from the frist position to a second disk release biased position in a direction substantially toward the opposite opposed side.

21. The disk holding case as defined in claim 20, and the body portion integrally secured to the an opposed side with a bridge portion, the bridge portion providing for flexing of the release mechanism between the first and second release mechanism positions.

22. The disk holding case as defined in claim 21, and the release mechanism having a retaining arm extending from the body portion thereof in a direction transverse to the direction of operation of the release mechanism.

23. the disk retaining case as defined in claim 22, and the retaining arm having a disk retaining end portion.

24. The disk holding case as defined in claim 23, and the arm flexible through a plane substantially coextensive with the first and second opposed sides between an unbiased disk receiving position and a biased disk retaining position.

25. The disk holding case as defined in claim 23, and the retaining arm flexible in a direction through a plane transverse to the plane of extension of the first and second opposed sides from an unbiased disk receiving position to a biased position for permitting insertion of the disk in the holding case.

26. The disk holding case as defined in claim 25, and the retaining arm having an end portion including a disk contact surface for contacting with the disk for moving the retaining arm to the biased position for permitting insertion of the disk in the case.

27. The disk holding case as defined in claim 26, and the retaining arm end portion including a disk retaining shoulder.

28. The disk holding case as defined in claim 18, and one opposed side having card retaining means.

29. The disk holding case as defined in claim 28, and the card retaining means including first and second card retaining slits extending into the opposed side and parallel to each other and adjacent the top and bottom perimeter edges respectively.

30. The disk holding case as defined in claim 18, and the one opposed side including booklet retaining means.

31. The disk holding case as defined in claim 30, and the booklet retaining means including a bottom channel and a top channel and the top channel having a retaining flap flexible between a normal unbiased position and a biased booklet retaining position.

32. The disk holding case as defined in claim 18, and further including support means providing for support of the case.

33. The disk holding case as defined in claim 32, and the means providing for support including first and second holes extending into the front and back perimeter edges.

34. A case for holding a disk shaped object, comprising: first and second opposed sides each side lying substantially parallel and adjacent each other and each side having an exterior surface, and each side connected to the other around common perimeters thereof by top, back, bottom and front perimeter edges extending between the opposed sides and defining an interior volume of the case, an interior disk retaining space within the interior volume, an elongate disk access slot extending throught the front perimeter edge and communicating with the disk retaining space, a disk guiding track extending along the perimeter of the disk retaining space, an inclined plane portion within the interior volume of the case and the inclined plane portion having a top inclined edge extending downwardly in a direction from the back perimeter edge to the front perimeter edge and a portion of the guiding track coextensive with the top inclined edge and terminating on one end with the access slot, and a release mechanism for retaining the disk within the retaining space and the release mechanism operable for permitting removal of the disk from the retaining space the release mechanism located in one of the opposed sides and the release mechanism having a first unbiased position with a body portion thereof substantially flush with the surface of the opposed side in which it is located and movable from the first position to a second disk release biased position in a direction substantially toward the opposite opposed side.

35. The disk holding case as defined in claim 34, and the body portion integrally secured to an opposed side with a bridge portion, the bridge portion providing for flexing of the release mechanism between the first and second release mechanism positions.

36. The disk holding case as defined in claim 35, and the release mechanism having a retaining arm extending from the body portion thereof in a direction transverse to the direction of operation of the release mechanism.

37. The disk retaining case as defined in claim 36, and the retaining arm having a disk retaining end portion.

38. The disk holding case as defined in claim 37, and the arm flexible through a plane substantially coextensive with the first and second opposed sides between an unbiased disk receiving position and a biased disk retaining position.

39. The disk holding case as defined in claim 37, and the retaining arm flexible in a direction through a plane transverse to the plane of extension of the first and second opposed sides from an unbiased disk receiving position to a biased position for permitting insertion of the disk in the holding case.

40. The disk holding case as defined in claim 39, and the retaining arm having an end portion including a disk contact surface for contacting with the disk for moving the retaining arm to the biased position for permitting insertion of the disk in the case.

41. The disk holding case as defined in claim 40, and the retaining arm end portion including a disk retaining shoulder.

42. The disk holding case as defined in claim 34, and one opposed side having card retaining means.

43. the disk holding case as defined in claim 42, and the card retaining means including first and second card retaining slits extending into the opposed side and parallel to each other and adjacent the top and bottom perimeter edges respectively.

44. The disk holding case as defined in claim 34, and the one opposed side including booklet retaining means.

45. The disk holding case as defined in claim 44, and the booklet retaining means including a bottom channel and a top channel and the top channel having a retaining flap flexible between a normal unbiased position and a biased booklet retaining position.

46. The disk holding case as defined in claim 34, and further including support means providing for support of the case.

47. The disk holding case as defined in claim 46, and the means providing for support including first and second holes extending into the front and back perimeter edges.

* * * * *